E. Allen,
Making Fire Arms,
No. 27,415. Patented Mar. 13, 1860.
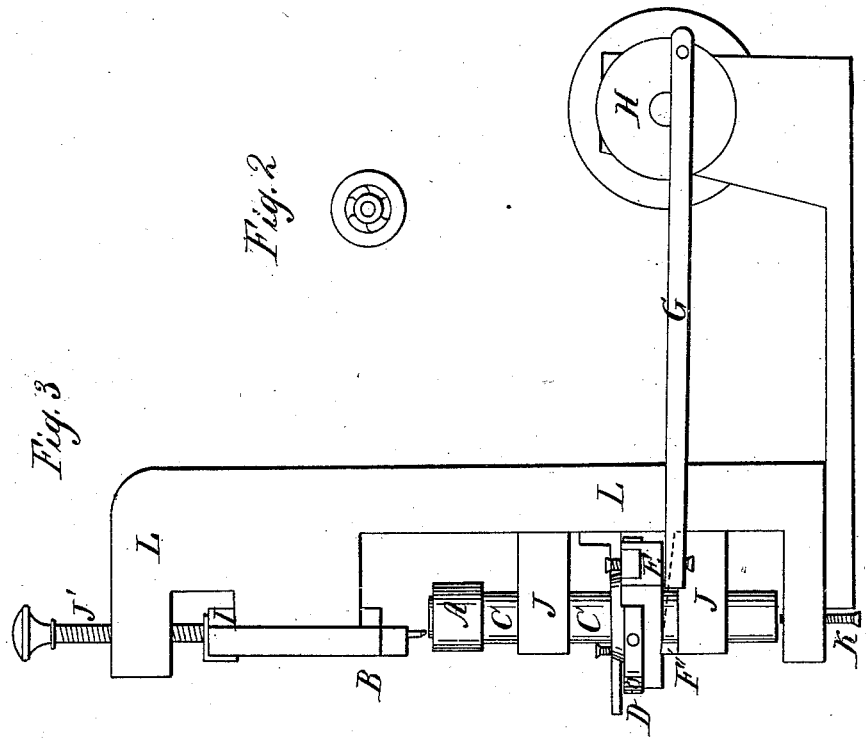
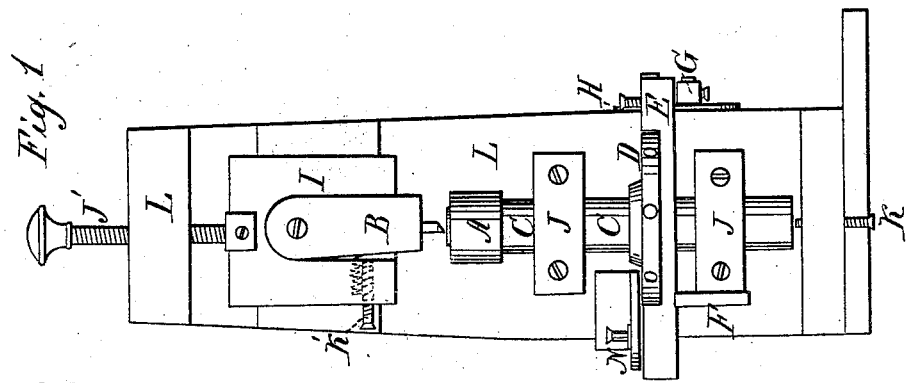
Witnesses
Geo. W. Fairfield
Jas. G. Arnold
Inventor
Ethan Allen

UNITED STATES PATENT OFFICE.

ETHAN ALLEN, OF WORCESTER, MASSACHUSETTS.

IMPROVEMENT IN CONSTRUCTING FIRE-ARMS.

Specification forming part of Letters Patent No. 27,415, dated March 13, 1860.

*To all whom it may concern:*

Be it known that I, ETHAN ALLEN, of the city and county of Worcester, State of Massachusetts, have invented certain new and useful Improvements in Machinery for the Manufacture of Fire-Arms; and I hereby declare the following to be a full, clear, and exact description of the construction and operation of the same, reference being had to the accompanying drawings, in which—

Figure 1 is a front view of the machine. Fig. 3 is a side view of the same, and Fig. 2 shows the end of the cylinder with the notches as made by the machine.

In the construction of my invention C C is an arbor supported in bearings J J, attached to the frame L and moving in them.

D is a plate or collar with holes or notches in its edge to receive the index E, and is firmly attached to C.

E is the index or stop (consisting of a slide with pin or projection to fit into the holes or notches in the plate D) placed in an arm turning on C or with it and resting on the incline F, which is secured to the bearing or frame, and is of such inclination as to give the proper bevel to the bottom of the notches in A.

N is a screw to fasten the arm carrying E, when desired.

G is a connecting-rod from E to a crank or shaft H.

K is a relieving-screw to support the arbor C when desired to raise it from the incline F.

I is a slide operated by the screw J' and carrying a tool-holder B, hung on a pin at its upper end and having a spring to allow a side play when desired.

A is the cylinder or chambers, on the upper end of which the notches are being made, and is supported firmly on the arbor C.

The operation is as follows, viz: Place the cylinder A on the arbor C and raise the screw K to support C and tighten screws N and K, and by turning the screw J force down the tool into the end of A, making a notch. Then raising it withdraw the index E and turn the collar D and by it C and A to position for the next one and press it like the first. Having worked the whole number once or twice round, as thought best, the screws K' N K are loosened to free their respective parts, the latter allowing the arbor C, through its collar D and arm of E, to rest on the incline F. Motion is now given to the shaft H, which, giving partially rotary motion to C through E corresponding to the sloping surface of the required notches, a proper tool being set in B, is adjusted by J' to cut or trim the sloping face of each notch in turn, shifting for each, as before.

The notches may be entirely formed by the first part of the operation on small work, and one or more notches may be made at each time; but on large work it will be found necessary to use the last part of the operation or planing motion to remove the stock in forming the notches, and the first part of the operation or pressing may be used to smooth the bottom of the notches, solidify the stock or metal, and make a fine finish.

Having thus fully described my invention, what I claim therein as new, and desire to secure by Letters Patent, is—

Making or forming notches or catches on cylinders of fire-arms or other work by pressing or cutting, or both, in the manner and for the purposes as above set forth and described.

ETHAN ALLEN.

Witnesses:
GEORGE W. FAIRFIELD,
THOS. P. WHEELOCK.